No. 760,591. PATENTED MAY 24, 1904.
E. P. WARNER.
FAN MOTOR SUPPORT.
APPLICATION FILED SEPT. 8, 1902.
NO MODEL.
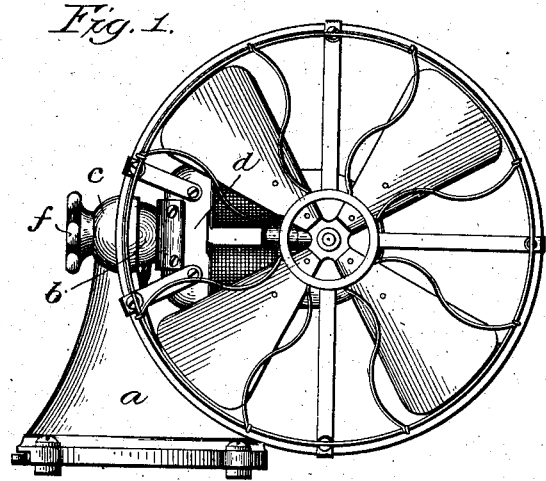
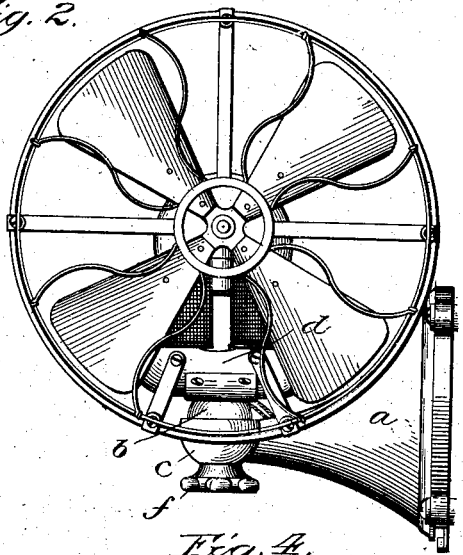
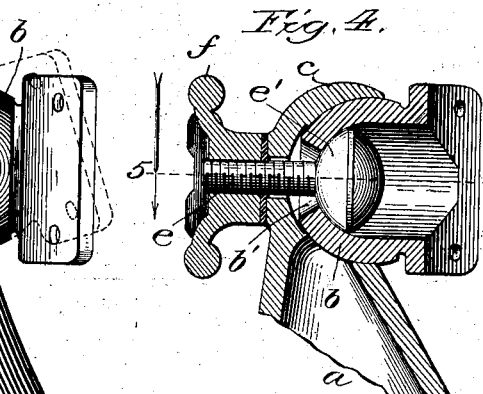
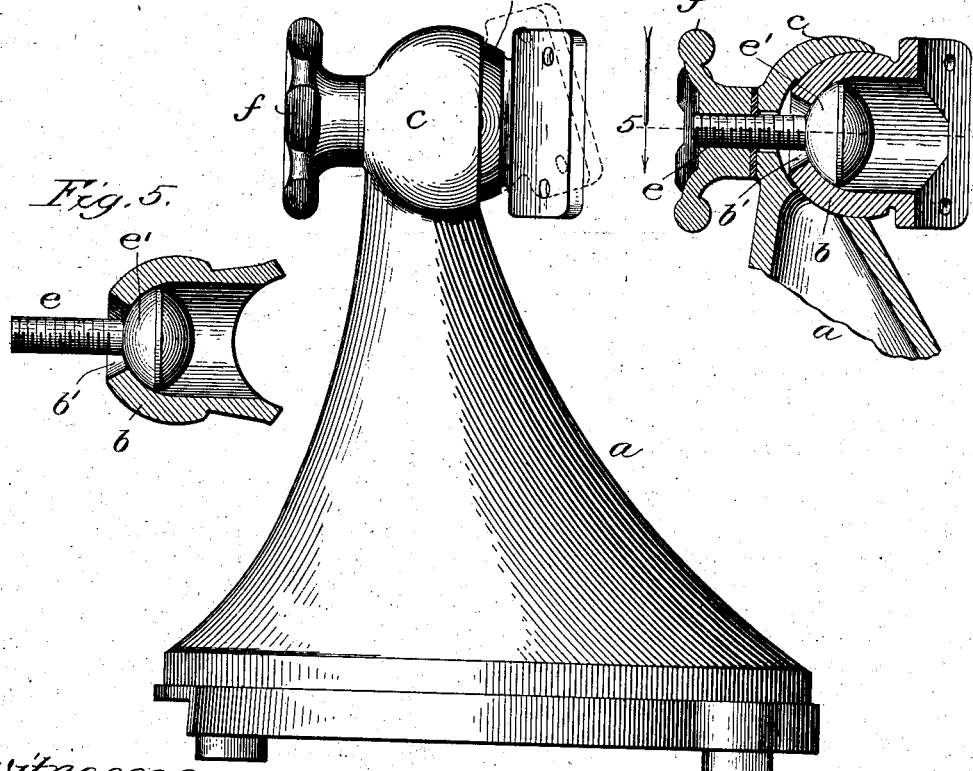
Inventor:
Ernest P. Warner, No. 760,591. Patented May 24, 1904.

UNITED STATES PATENT OFFICE.

ERNEST P. WARNER, OF CHICAGO, ILLINOIS, ASSIGNOR TO WESTERN ELECTRIC COMPANY, OF CHICAGO, ILLINOIS, A CORPORATION OF ILLINOIS.

FAN-MOTOR SUPPORT.

SPECIFICATION forming part of Letters Patent No. 760,591, dated May 24, 1904.

Application filed September 8, 1902. Serial No. 122,478. (No model.)

*To all whom it may concern:*

Be it known that I, ERNEST P. WARNER, a citizen of the United States, residing at Chicago, in the county of Cook and State of Illinois, have invented a certain new and useful Improvement in Fan-Motor Supports, of which the following is a full, clear, concise, and exact description.

My invention relates to a fan-motor support, and has for its object to provide a simple structure by which the fan may be directed up or down or toward either side and securely clamped in any of its positions of adjustment.

My invention will be described by reference to the accompanying drawings, in which—

Figure 1 is a view in elevation of an electric fan equipped with my improved support. Fig. 2 is a view showing the same fastened to a wall. Fig. 3 is a detail view of the support. Fig. 4 is a detail sectional view of an adjustable ball-and-socket joint by which the motor-frame is connected to the supporting-base, and Fig. 5 is a detail sectional view of the hollow ball portion of the ball-and-socket joint at right angles to the section thereof shown in Fig. 4.

Similar letters of reference are used to designate the same parts wherever they are shown.

The base or support $a$, which may be adapted to rest upon a table, as shown in Fig. 1, or fastened to a wall, as shown in Fig. 2, is provided with a portion $c$, adapted to form the socket of a ball-and-socket joint, the ball portion $b$ whereof carries the frame $d$ of the fan-motor. The ball portion $b$ is hollow, as shown in Figs. 4 and 5, and is provided with a hole $b'$, through which is passed the shank of a clamping-bolt $e$. The head of the clamping-bolt is formed with a bearing-surface $e'$, which may be of spherical curvature, fitting the concave inner surface of the ball $b$, and the hole $b'$ is considerably larger than the shank $e$ of the bolt, thus allowing the motor-frame carried by the ball $b$ not only to be rotated completely around the bolt $e$ as an axis, but also to be tipped considerably in any direction, giving the characteristic advantages of adjustment of the ball-and-socket joint. A clamping-nut $f$ is provided for the shank of the bolt $e$, which projects through the socket $c$, whereby the head $e'$ of the bolt may be drawn tightly against the inner surface of the hollow ball $b$ to clamp the ball and the motor-frame supported thereby in any position of adjustment.

Having described my invention, I claim—

1. In a fan-motor support, the combination with the base $a$ having the socket $c$, of the hollow ball $b$ resting in said socket and carrying the motor-frame $d$, the clamping-bolt $e$ passing through the ball and socket and having a head bearing upon the inside of the hollow ball, the circular hole in said ball through which the bolt passes being enlarged, and the clamping-nut $f$ on the shank of said bolt projecting through the socket, adapted to draw the head of the bolt against the inner wall of the hollow ball.

2. In a fan-motor support, the combination with the base $a$ and the motor-frame $d$, of a ball and-socket joint uniting the same, said joint comprising the socket $c$, the hollow ball $b$ resting in said socket, the clamping-bolt $e$ passing through the ball and socket and having a head bearing upon the inside of the hollow ball, the circular hole in said ball through which the bolt passes being considerably larger than the shank of said bolt, and the clamping-nut $f$ on the shank of said bolt projecting through the socket adapted to draw the head of the bolt against the inner wall of the hollow ball.

In witness whereof I hereunto subscribe my name this 7th day of July, A. D. 1902.

ERNEST P. WARNER.

Witnesses:
EDWIN H. SMYTHE,
FREDERICK A. WATKINS.